US006129796A

United States Patent [19]

Steinberg et al.

[11] Patent Number: 6,129,796

[45] Date of Patent: Oct. 10, 2000

[54] APPARATUS AND METHOD FOR DISPENSING AND LABELING CORD

[75] Inventors: David Steinberg, Needham; William Davis, Ashland, both of Mass.

[73] Assignee: Winchester-Auburn Mills, Inc., Woburn, Mass.

[21] Appl. No.: 09/005,951

[22] Filed: Jan. 9, 1998

Related U.S. Application Data

[63] Continuation-in-part of application No. 08/874,441, Jun. 16, 1997, abandoned, which is a continuation of application No. 08/349,816, Dec. 6, 1994, abandoned.

[51] Int. Cl.$^7$ ................................ B32B 1/10; B32B 1/00

[52] U.S. Cl. ........................... 156/64; 156/270; 156/277; 156/378; 156/522

[58] Field of Search ............................. 156/522, 64, 270, 156/277, 378, 193, 510; 53/399, 419, 415, 139.1, 137.2, 136.1, 135.1, 583, 584, 582; 493/375, 961; 40/309, 316; 83/425; 242/554.2; 428/421

[56] References Cited

U.S. PATENT DOCUMENTS

| | | | |
|---|---|---|---|
| 019,272 | 4/1977 | Kerz | 40/316 |
| 951,147 | 3/1910 | Porter | 40/316 X |
| 1,632,030 | 6/1927 | Martin | 283/81 X |
| 1,635,750 | 7/1927 | Jenks | 40/316 |
| 2,914,166 | 11/1959 | Bihler | 440/316 X |
| 3,474,559 | 10/1969 | Hunt | 40/316 |
| 3,896,246 | 7/1975 | Brady, Jr. | 428/41 |
| 4,004,362 | 1/1977 | Barbieri | 40/316 |
| 4,041,383 | 8/1977 | Howard | 324/66 |
| 4,351,113 | 9/1982 | Eggerstsen et al. | 33/137 R |
| 4,471,870 | 9/1984 | Uhug | 206/150 |
| 4,537,106 | 8/1985 | Rider | 83/650 |
| 4,575,625 | 3/1986 | Knowles | 235/467 |
| 4,578,136 | 3/1986 | Brown | 40/316 X |
| 4,579,759 | 4/1986 | Breuers | 428/36 |
| 4,609,208 | 9/1986 | Wrobei | 283/81 |
| 4,659,416 | 4/1987 | Johannson | 156/384 |
| 4,894,106 | 1/1990 | Instance | 283/106 X |
| 4,963,719 | 10/1990 | Brooks et al | 235/462 |
| 4,999,980 | 3/1991 | McGowan | 54/23 |
| 5,039,131 | 8/1991 | Scholtysik | 283/81 |
| 5,065,527 | 11/1991 | Shaw | 33/734 |
| 5,114,187 | 5/1992 | Branch | 283/81 |
| 5,227,209 | 7/1993 | Garland | 428/40 |
| 5,259,648 | 11/1993 | Gerber | 283/81 |
| 5,271,642 | 12/1993 | Jahier et al. | 283/81 |
| 5,361,663 | 11/1994 | Hayes et al. | 83/522.19 |
| 5,366,250 | 11/1994 | Sunabe | 283/81 |
| 5,496,070 | 3/1996 | Thompson | 283/2 |
| 5,777,315 | 7/1998 | Wilz | 235/472 |

FOREIGN PATENT DOCUMENTS

| | | | |
|---|---|---|---|
| 1319913 | 2/1965 | France | 40/316 |
| 221283 | 11/1967 | Sweden | 40/316 |

*Primary Examiner*—Richard Crispino
*Assistant Examiner*—George R. Koch, III
*Attorney, Agent, or Firm*—David Wolf

[57] ABSTRACT

An apparatus and method is provided for dispensing and labeling a selected length of cord from a spool of bulk material. One embodiment of the invention consists of at least one spool of cord from which a length of cord is drawn and an apparatus for measuring, labeling, tracking and cutting the selected length of cord. After the length of cord has been measured, a label is applied to the cord at the selected length from a lead end of the spool. The label is imprinted with at least one pair of functionally related identification elements, such as bar code indicia, and is adapted to be wrapped around the cord, to identify the cord and facilitate severing the cord from the spool. The information contained on the functionally related elements is entered into a computer, either manually or by scanning, for pricing and inventory control. The length of cord is then separated from the spool by severing it through the label intermediate the pair of bar code indicia so that a first portion of the label remains applied to the severed length of cord, and a second portion of the label remains applied to the lead end of the spool. The invention also embodies a method for labeling the length of cord that is cut from the spool. The method includes dispensing the length of cord, applying the label to the cord, and severing the cord between the pair of functionally related identification elements imprinted on the label.

16 Claims, 7 Drawing Sheets

APPARATUS AND METHOD FOR DISPENSING AND LABELING CORD

CROSS-REFERENCE TO RELATED APPLICATION

This application is a continuation-in-part of the inventor's pending U.S. application Ser. No. 08/874,441, entitled SYSTEM AND METHOD FOR DISPENSING AND LABELING A CORD, filed Jun. 16, 1997, which is incorporated herein by reference, and which is a continuation of the inventor's U.S. application Ser. No. 08/349,816 filed Dec. 06, 1994, both now abandoned, and also entitled SYSTEM AND METHOD FOR DISPENSING AND LABELING A CORD.

TECHNICAL FIELD

The present invention relates to an apparatus and method for labeling a selected length of cord dispensed from a spool of bulk material. More particularly, the present invention is directed to an apparatus for measuring and labeling a length of cord with identifying indicia and a method for applying the indicia to identify the selected length of cord.

BACKGROUND OF RELATED ART

Cords, such as rope, cable, wire, chain and electrical cord, are commonly offered for sale by retailers in the form of bulk material from which a consumer can select and purchase a desired quantity. Typically, retailers offer for sale a wide variety of continuous length cord on individual spools. The consumer purchases cord by selecting the type and length of a particular cord which is then manually unwound and severed from the spool. The length of cord is then presented to a sales clerk at the checkout counter for purchase by the consumer.

A problem associated with this method of sale is that the length of cord presented for purchase carries no pricing information or product description from which the sales clerk can determine the correct price, and which could also be used to take an inventory accounting of the sale for the particular cord. Thus, a customer may be charged the wrong price for the particular length of cord selected. In addition, without an accurate inventory accounting the retailer may not recognize that a spool of cord is almost empty and requires replacing. Likewise, a customer desiring to purchase a particular length of cord may not find out until after the cord has been unwound that there is not enough cord for his or her needs.

Some methods currently exist for identifying a length of cord dispensed from a spool to determine its price and take an inventory accounting. One method requires the consumer or sales clerk to record a displayed product code for the particular cord being purchased on a separate slip of paper that is presented to the sales clerk at the time of sale. The clerk enters the product code and quantity of the cord into the sales register so that the correct price for the cord is determined using product information stored in the retailer's database. Another method uses separate cards preprinted with bar code indicia for identifying the cord on each spool. The consumer takes a bar code card corresponding to the particular cord being purchased, and presents the card to a sales clerk at the time of purchase. The sales clerk then scans the bar code to identify the particular cord and manually inputs the length of cord into the sales register to determine the correct price from its product database.

Although these methods attempt to address the problem of identifying a length of cord selected from a spool, they nevertheless have limitations. These methods rely upon an honor system that requires a customer to accurately record the product code or select the correct bar code card corresponding to the particular cord being purchased. It is very easy for the customer to become confused in identifying the proper product code or bar code card to present to the sales clerk. The sales clerk may also incorrectly input the product code into the sales register. Further, a customer can intentionally present the product code or bar code card of a cheaper cord to the sales clerk so that the price actually paid is lower than that which should have been paid for the cord. Additionally, such systems do not lend themselves to inventory control.

There is therefore needed an apparatus and method for measuring and labeling a length of cord with an identifying label bearing indicia for pricing and/or inventory control.

SUMMARY

It is an object of the present invention to provide an apparatus for measuring and labeling a selected length of cord with an identifying label bearing indicia for pricing and/or inventory control.

It is another object of the present invention to provide a bar code label for applying to each end of a selected length of cord to utilize conventional bar code scanning technology for pricing and/or inventory control.

It is another object of the present invention to provide a method for labeling a cord to reduce the risk of misidentifying or misrepresenting a selected length of cord so that a customer is charged the correct price at the time of sale.

It is a further object of the present invention to provide a method for labeling a cord to facilitate the inventory control of bulk cord products.

The foregoing disadvantages are overcome in one illustrated embodiment of the invention for dispensing and labeling a length of cord. The embodiment includes at least one spool of cord from which a length of cord is drawn, an apparatus including a measuring device for measuring the selected length of cord, a dispensing device for providing a label bearing at least one pair of functionally related indicia containing identifying information or parameters, an input device for scanning and inputting the information contained on the label, a computer for storing and tracking information input by the scanner and a cord cutting device for cutting the length of cord and also for severing the label into two separate components, one component remaining on the trail end of the severed cord and the other remaining on the leading end of the cord remaining on the spool.

The invention is also directed to a label carrying at least one pair of functionally related elements or indicia for identifying a selected length of cord for sale and a method of applying the label. The label preferably includes a thin sheet of flexible, adhesive backed material that can be applied to the cord on either side of a point defining a trail end at which the cord is to be severed, intermediate the pair of indicia. The label is adapted to be severed with the selected length of cord so that at least one group of identifying indicia is located on each side of the point of severing. By this method, the length of cord will contain a lead end bearing one group of identifying indicia and a trail end bearing a corresponding group of identifying indicia.

The invention also contemplates a length of cord that is labeled at each end to identify the cord for sale. Each label bears identifying indicia that correspond to the identifying indicia on the other corresponding label so as to identify the length of cord for sale.

The invention further contemplates a spool for dispensing cord including indicia for visually identifying the length of cord remaining on the spool.

Numerous other objects, features and advantages of the invention should become apparent upon a reading of the following detailed description taken in conjunction with the accompanying drawings.

DETAILED DESCRIPTION OF THE ILLUSTRATIVE EMBODIMENTS

Figure 1:
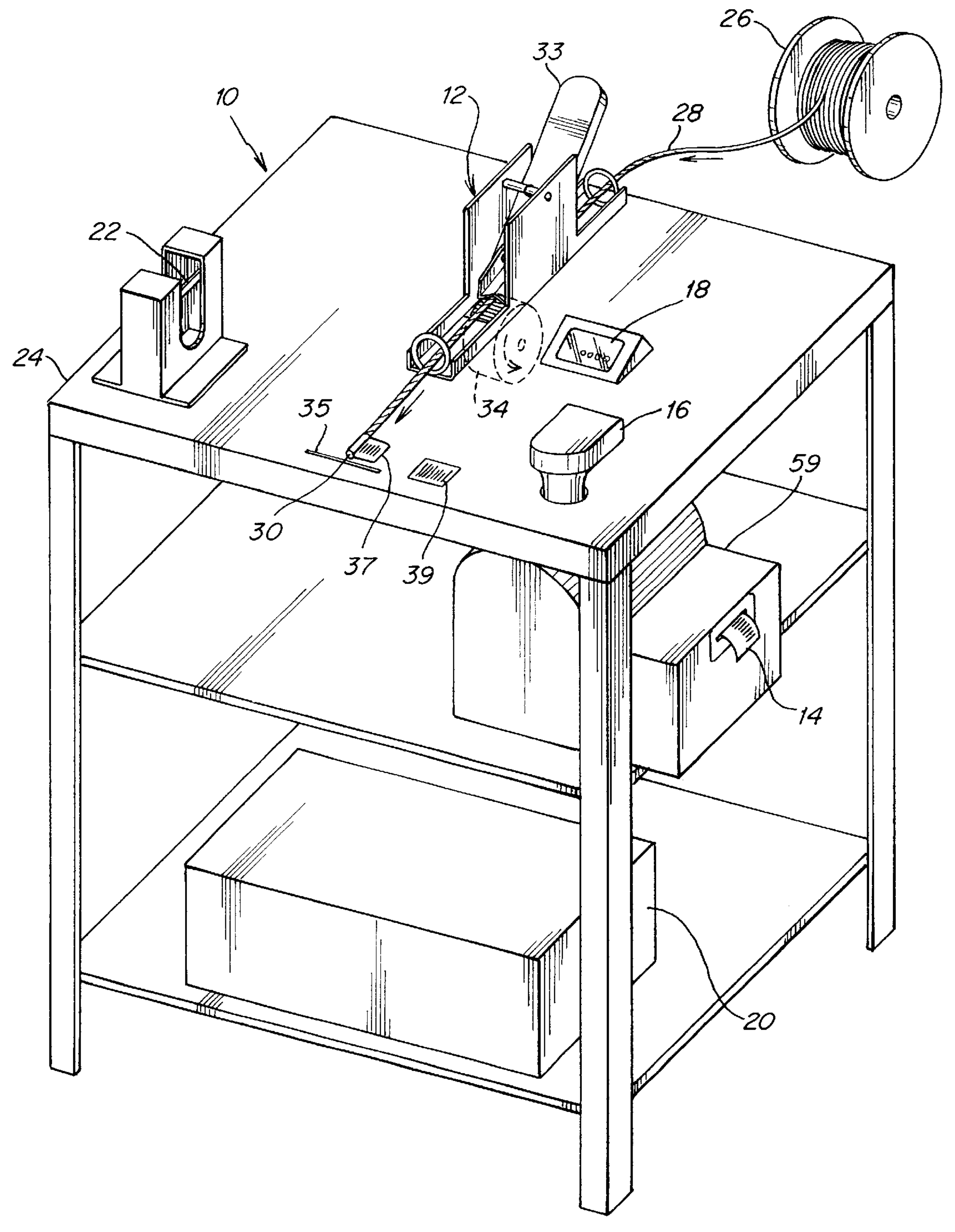
FIG. 1 is a perspective view of an apparatus for dispensing and labeling a selected length of cord according to the present invention.
Figure 3:
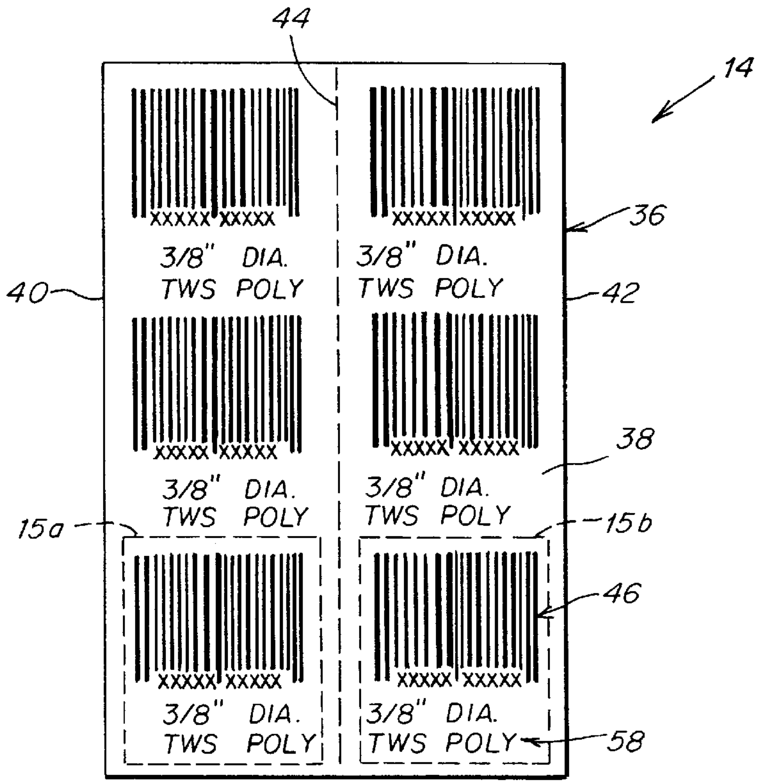
FIG. 3 is a front view of a label according to the present invention.

The present invention is directed to an apparatus and method for dispensing and labeling a selected length of cord for purchase by a consumer. As used herein, the term "cord" refers to rope, cable, wire, chain electrical cord and the like, which is capable of being dispensed, measured and severed for purchase. An illustrative embodiment of the apparatus 10 is shown in FIG. 1. The apparatus 10 preferably includes such components as a measuring device 12 for measuring the selected length of cord, a dispensing device 13 for dispensing a plurality of labels, each label 14 including at least one pair of functionally related indicia 15*a*, 15*b* (FIG. 3) containing identifying information or parameters, a scanner 16 or other input device for identifying the information carried on label 14, a counter 18 for visually displaying the selected length of cord dispensed, a computer 20 for storing information carried on the label and tracking inventory, a cutting device 22 for cutting the length of cord and also for severing the label into two separate components, and a cabinet or cart 24 for housing the components.

Figure 2:
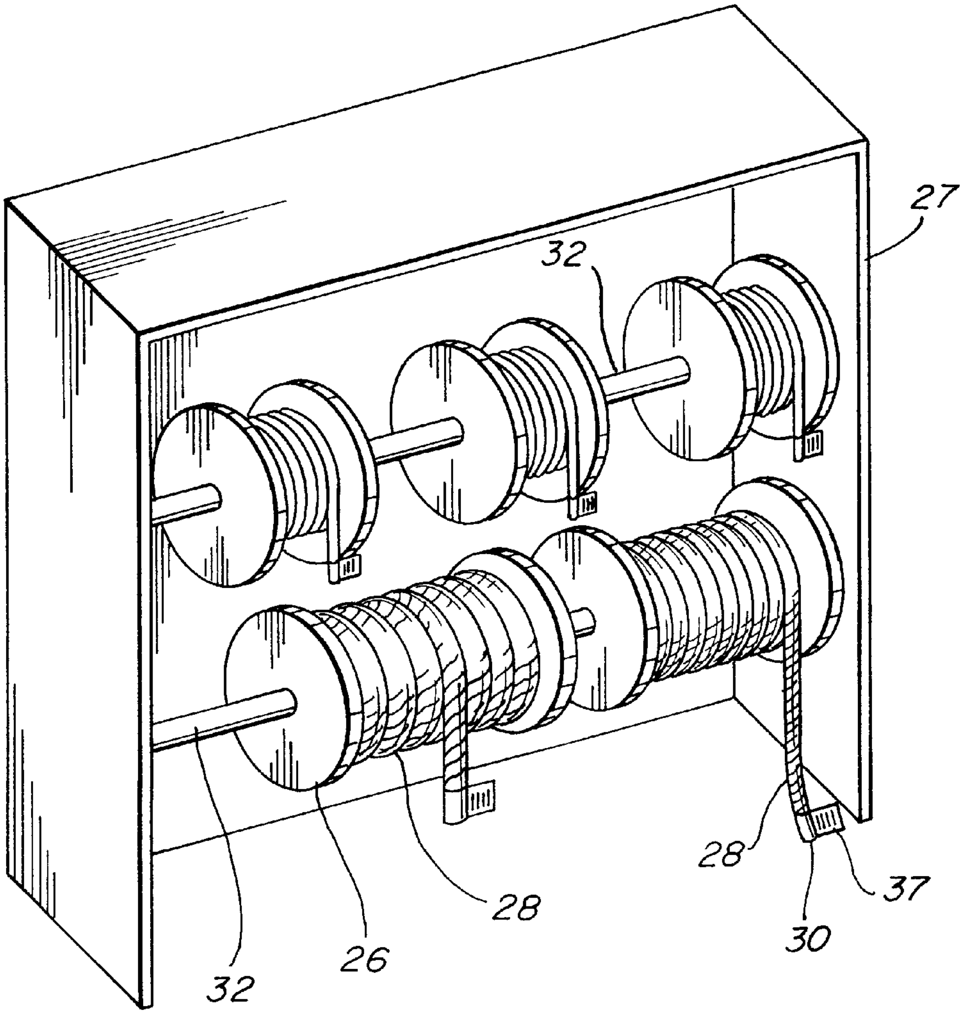
FIG. 2 is a schematic view of multiple spools for dispensing various types of cord for use with the apparatus of FIG. 1.
Figure 8:
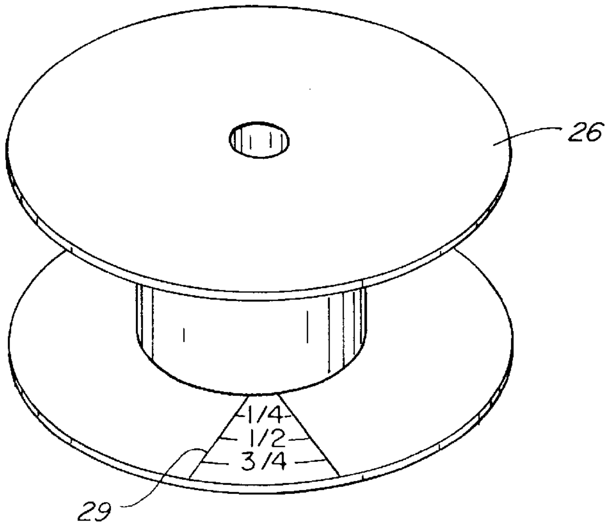
FIG. 8 is a perspective view of a spool for dispensing cord including indicia for visually identifying the length of cord remaining on the spool.

The system contemplates feeding and measuring cord selected from one spool of preferably a plurality of spools 26 (FIG. 2) commonly mounted in a housing 27, each spool 26 preferably being different. As shown in FIG. 2, each spool 26 is preferably wound with a continuous length of cord 28 and is preferably supported and rotatably mounted on a corresponding shaft 32, the shaft 32 being supported in a housing 27. The continuous length of cord 28 includes a lead end 30 which is prepared with a lead label 37 to identify the particular spool of cord. This lead label 37 may comprise a label consistent with those illustrated in FIGS. 3 and 4, as described in greater detail below. Each spool 26 also preferably includes a code label 31 containing information which may be scanned, or manually entered into the computer, to reset the inventory data at the beginning of a new spool for a particular type of cord. The code label may be in the form of a barcode disposed on the side of the spool and should preferably be scanned prior to dispensing the first length of cord from the spool. The spool 26 may also carry a visual indication for displaying the approximate amount of cord left on spool. For example, as shown in FIG. 8, spool 26 may include a colored, pie shaped portion 29 having markings, preferably ¼, ½ and ¾ for indicating how much of the cord is left on the spool. Alternatively, the visual indication may include other shapes, such as a thermometer, etc., as would be known to one of skill in the art.

Referring again to FIG. 1, the lead end 30 of the cord 28 is fed into measuring device 12 for measuring a desired length of cord 11. Measuring device 12 is preferably connected to an encoder (not shown) which is connected to both counter 18 and computer 20 such that advancement of the cord is translated into a measurement displayed to the consumer on the counter 18 while being stored and tracked by the computer for inventory control. In the case of rope and the like, measuring device 12 preferably includes a pivotal lever 33 which is spring biased for holding the cord in frictional engagement over a wheel 34. As the cord passes over the wheel, wheel 34 rotates, with the number of rotations of the wheel being fed into the encoder that translates movement of the wheel into a measurement of the length of the cord which is displayed by the counter and stored in the computer. As the cord is advanced and the wheel rotates, measurement of the length of cord passed through the measuring device is displayed on counter 18, and the amount of cord remaining on the spool available for sale is also preferably displayed. Forward movement of the cord preferably increases the measurement displayed on counter 18 and, likewise, rearward movement of the cord preferably decreases the measurement displayed on the counter. This allows the user to know in a precise manner how much cord has been selected. Measuring device 12 may be a conventional length meter, for example, available from C.W. Lint Co., Homewood, Ill. under product no. 1430, although other measuring devices may readily be utilized. Counter 18 may also be a conventional counter, for example a digital counter available from Cutler-Hammer Corp., Greenbay, Wis. Alternately, as shown in FIG. 10, for non-linear measurement of chains and the like, measuring device 12 preferably includes a container 43 for receiving the chain, the container being connected to scale 45 for measuring the weight of the particular type of chain dispensed. The scale inputs the weight into the encoder which translates the weight of the type of chain selected into a measurement of the length of the chain, corresponding to the particular type of chain selected, the length being displayed by the counter and stored in the computer.

Measurement of the length of cord preferably begins after the user first moves the leading end 30 of the cord to a start line 35 located on the cabinet and manually scans lead label 37 attached to the leading end of the cord. Moving the leading end 30 to the start line 35 ensures that an accurate measurement of the cord will be taken as the cord is advanced through measuring device 12 by beginning measurement of each length of cord at the same point each time. Scanning lead label 37 operates to input the parameters for the cord into the computer 20 to identify the particular type of cord being selected. The lead label 37 is preferably scanned with a conventional laser scanner 16 which is connected to computer 20, alternately, a conventional key pad for manual code entry may be preferred by the user, for cost and maintenance reasons. The label may include various types of information which will enable the retailer to monitor consumer purchases of particular types of cord, for example the retailer may track such parameters as the cord's color, diameter, manufacturer, etc. Likewise, the measurement of the selected length of cord is fed into computer 20 so that the inventory of the various types of bulk cord can be tracked by the retailer and displayed at the point of sale.

After the desired length of cord has been selected by the consumer a "stop" barcode 39 is scanned which indicates to the computer that the desired length of cord has been selected, the stop barcode 39 preferably being located on the cart or cabinet as illustrated in FIG. 1. Scanning the stop barcode 39 preferably activates a locking mechanism which locks the cord in place so that no further cord may be dispensed prior to severing the cord. Scanning the stop barcode also preferably signals printer 13, which is attached to the computer, to automatically print label 14 which is then attached to either side of a trail end 62 (FIG. 9*f*) of the selected length of cord 11. Label 14 (FIG. 3) preferably includes a body 36 that has a front surface 38 upon which is printed at least one pair of functionally related indicia 15*a*, 15*b*.

Figure 4:
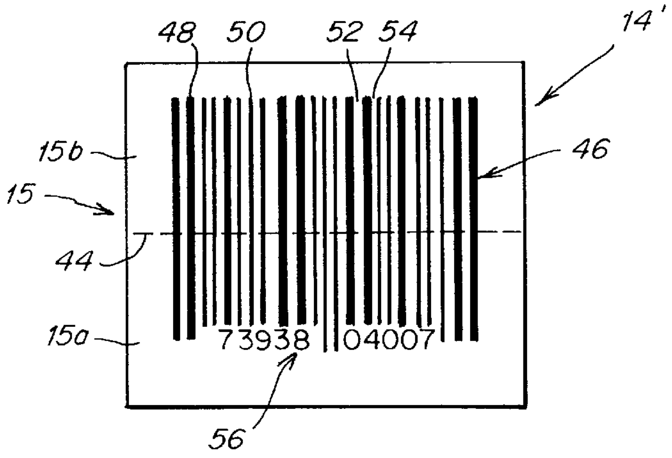
FIG. 4 is a diagrammatic view of a typical bar code.

The indicia 15*a*, 15*b* each contain various identifying parameters such as price, product number, product description, etc. which can be used to identify the cord. Indicia 15*a*, 15*b* preferably contain identical information for identifying the type of cord, but are preferably visually different from each other. In particular, indicia 15*a* preferably includes the measurement of the selected length of cord dispensed, or a space for writing in the length dispensed, while indicia 15*b* preferably includes the measurement of the cord remaining on the spool after the selected length has been dispensed. While it is preferred that the identifying indicia 15*a*, 15*b* contain identical identifying parameters while being visually different, they need only be functionally related to each other so that a selected length of cord 11 can be properly identified when comparing the related indicia 15*a*, 15*b*. It is also preferred that a series of indicia 15*a*, 15*b* be printed on each label 14 so that at least one pair of identifying indicia 15*a*, 15*b* can be viewed after wrapping the label 14 on any diameter cord 28. Alternatively, a single group of indicia 15 may be cut along the cut line 44 so that two identical groups 15*a*, 15*b* are formed from the one group 15 (FIG. 4). For example, a bar code having a group of parallel lines (forming one group 15) can be transversely cut through the parallel lines so that two bar codes are formed with identical indicia (identifying indicia 15*a*, 15*b*).

In a preferred embodiment, each group of identifying indicia 15*a*, 15*b* includes bar code indicia. Currently bar code technology is used by a majority of retailers for price information, and to control inventory by accounting for their merchandise at the point of sale. Referring to FIG. 4, a typical bar code 46 is comprised of a parallel combination of wide lines 48, narrow lines 50, wide spaces 52, and narrow spaces 54. Each combination of lines 48 and 50 in combination with spaces 52 and 54 creates a unique alphanumeric code that can be identified at the time of sale using bar code scanning equipment. Thus, a unique bar code 46 can be created for each type and size of cord 28 that is sold by a retailer. These individual alphanumeric codes can be stored by the retailer in a database which can include the description and price of each cord. Therefore, the bar code 46 can be scanned at the point of sale to automatically identify, correctly price, and take an inventory accounting of the cord. Additionally, an alphanumeric equivalent 56 of the bar code 46 is provided so that retailers can identify a particular item without use of bar code scanning equipment by manually inputting the alphanumeric code 56 into a sales register. In the present invention, it is preferred that a product description 58 of the cord also be included within the group of identifying indicia. The product description 58 alternatively enables the consumer or sales clerk to visually compare the label to the cord to ensure that the proper label has been attached to the cord being purchased. A space can also be provided on the label for manually recording or printing the length of cord being purchased or the length of cord remaining on the spool.

In one embodiment of the invention, the label body 36 is made from a coated paper base material of eighty-pound weight having a pressure sensitive adhesive applied to the back surface that is opposite the front surface 38. The paper base material is thin and flexible to facilitate wrapping the label around the cord. Each label is individually backed with a release paper that is removed to expose the adhesive prior to applying the label to the cord. The release paper is a specially treated paper that prevents the label from adhering to it. The label can be provided in different sizes to apply to various sizes of cord that may be sold by a retailer. Further, the labels can be provided in different colors corresponding to a particular spool as an additional way for consumers and sales clerks to distinguish and identify the particular cord. In the present embodiment, labels 14 are automatically printed at the time the stop barcode 39 is scanned, by printer 13 (FIG. 1). Alternatively, each label may be dispensed in a series on a continuous roll of release paper or a roll of a continuous length of label can be provided from which a desired length of label can be dispensed for applying to the cord.

Figure 9A:
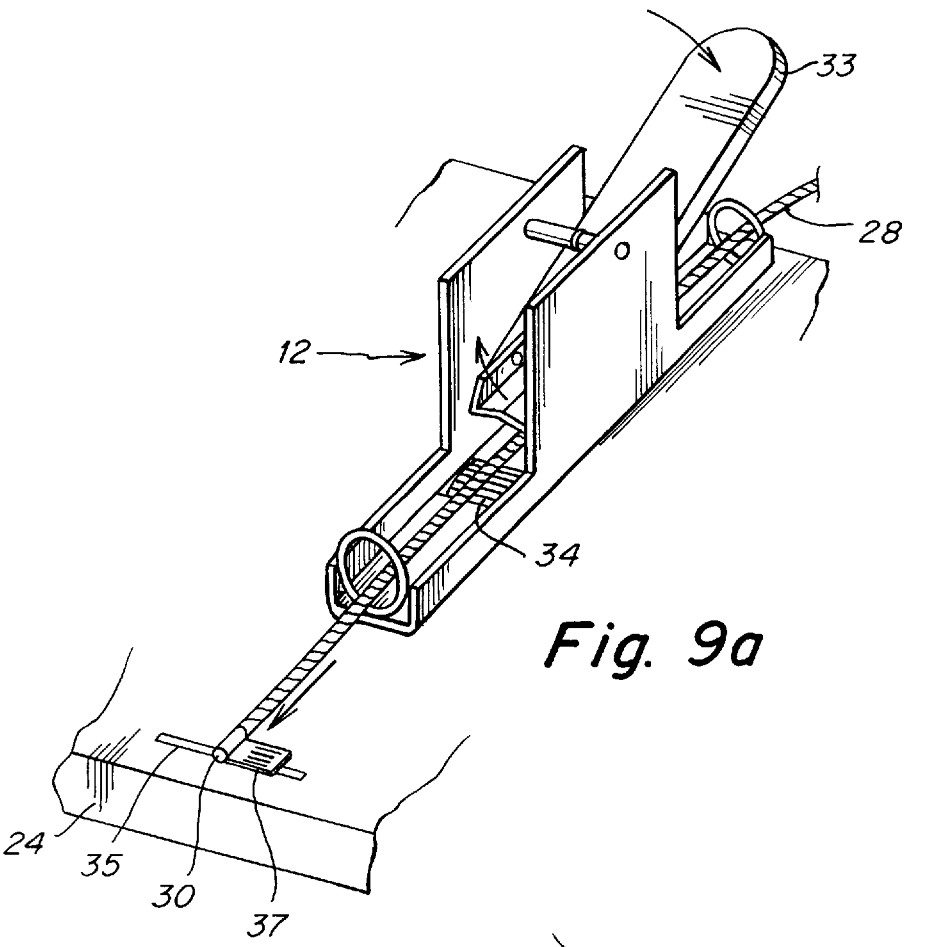
FIGS. 9*a*–9*h* are diagrammatic illustrations of one method for dispensing and labeling a selected length of cord utilizing the apparatus of FIG. 1.
Figure 9B:
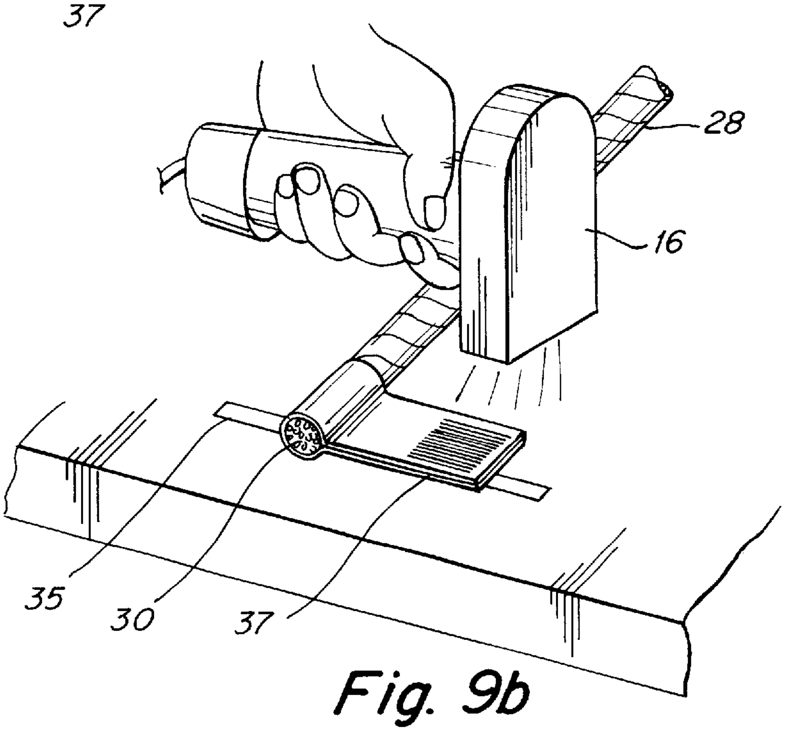
Figure 9C:
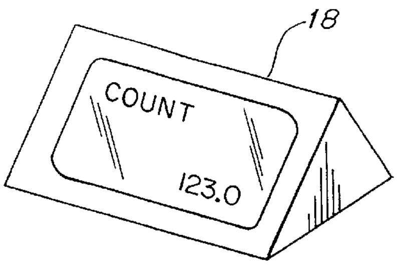
Figure 9D:
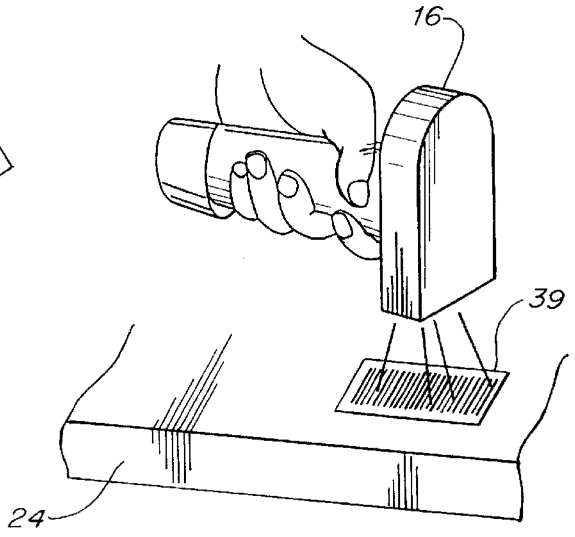
Figure 9E:
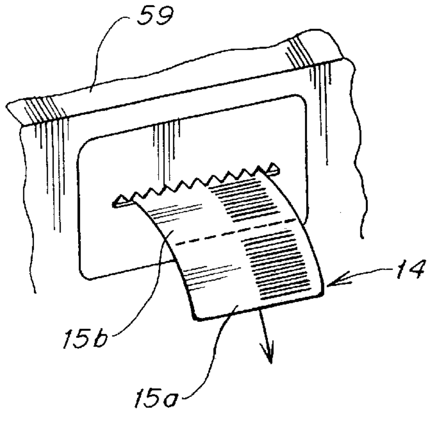
Figure 9F:
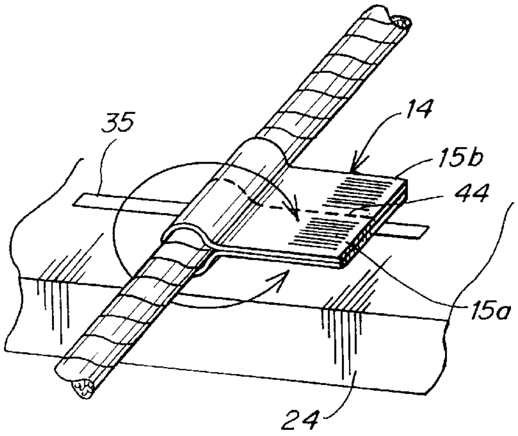
Figure 9G:
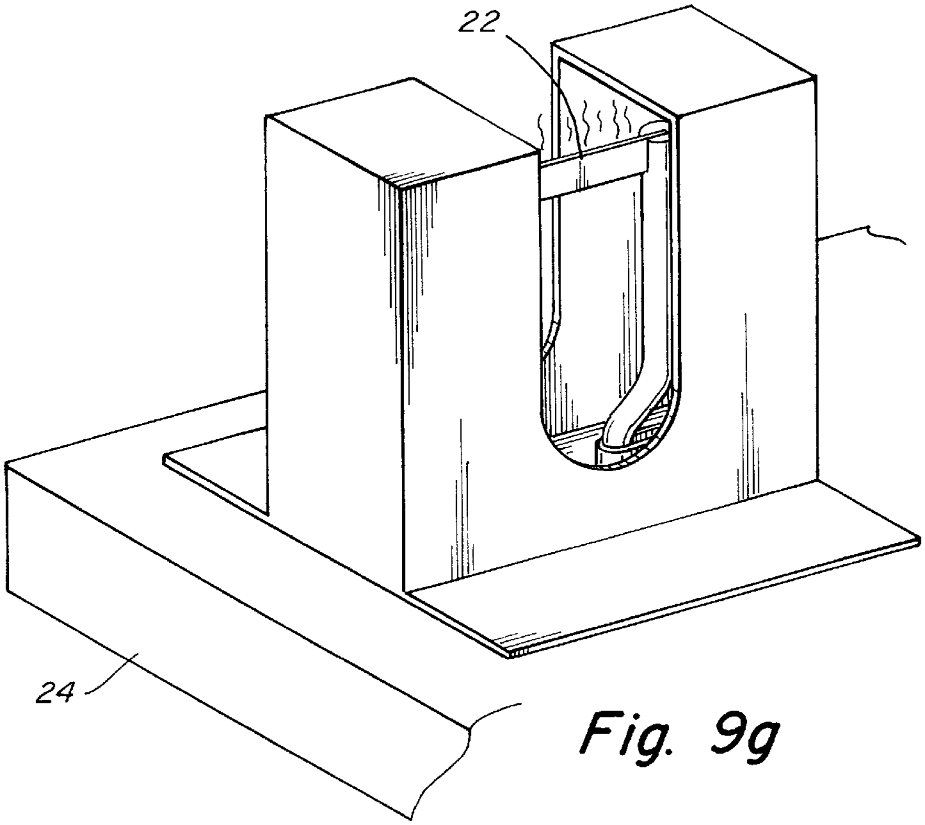
Figure 9H:
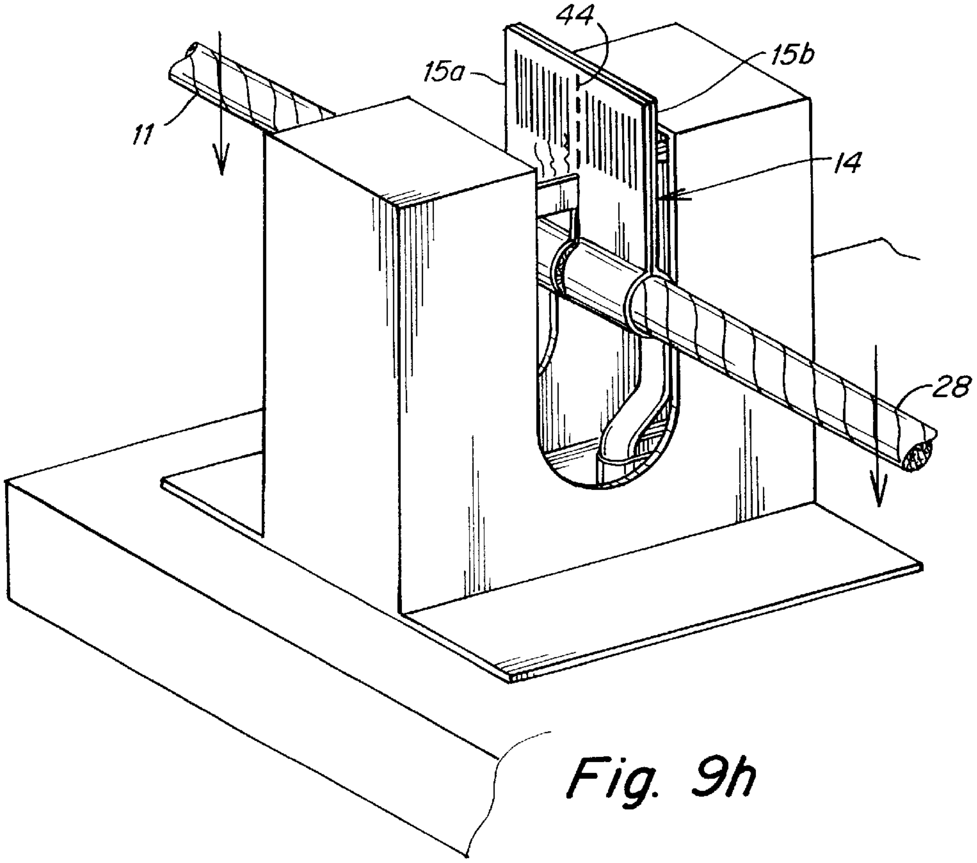

Once the label has been applied to the trail end of the cord, it is severed at cutting line 44 by cutting device 22 (FIGS. 1 and 9*g*–9*h*). Cutting device 22 preferably includes a cutting element 60 to cut through both the cord and the label. In the present embodiment, the cutting element 60 is a blade which is heated by a heating element so that the blade burns through the label and cord, although other cutting elements may be utilized, for example conventional cutting shears, wire cutters, or the like, as would be known to one of skill in the art. Burning through the label and cord helps ensure a clean cut through both the cord and label. Cutting device 22 may be a conventional device available from a variety of sources, for example Pearson Industries, Pratville, Ala. under the name Hot Cutter Box. Severing the cord also preferably releases the locking mechanism so that the cord 28 may once again be advanced through measuring device 12. An override switch (not shown) may also be provided to release the cord. Once severed, a first portion 41*a* of label 14 carrying indicia 15*a* and the amount of cord selected for purchase is preferably attached to the trail end 62 of the selected length of cord 11, and a second portion 37*b* of label 14 carrying indicia 15*b* and the amount of cord remaining on the spool is preferably attached to the lead end 30 of the spool of cord 28.

A method of dispensing and labeling a selected length of cord 11 utilizing apparatus 10 will now be described with reference to FIGS. 9*a*–9*h*. A spool of cord is provided, as described above, having a continuous length of cord 28, including a lead end 30. The lead end 30 is inserted into measuring device 12 and is advanced to the "start" line 35 labeled on the cart 24, as shown in FIG. 9*a*. The lead end 30 of the cord, which preferably includes a lead label 37 carrying identifying information which may be applied at the factory prior to shipment of the cord, or which may be applied to the new spool by the retailer, is then scanned to identify the particular type of cord being dispensed and to signal to the computer the beginning of the dispensing and labeling process (FIG. 9*b*). If the spool of cord 26 is a new spool from which no cord has yet been dispensed, the code label 31 (FIG. 2) disposed on the side of the spool is scanned, or the information on the code label is manually entered into a keypad, in order to reset the inventory data for the particular type of cord. The information for resetting inventory data may, alternately, be contained on the lead label of cord supplied with the new reel. Once the cord has been identified, the counter displays a "0" measurement until the cord is advanced past the start line. The cord is then fed through the measuring device and past the start line, with the counter 18 tracking and visually indicating to the user the length of cord which has been dispensed (FIG. 9*c*). The counter may also preferably display the amount of cord remaining on the spool available for sale. Once the desired length of cord has been dispensed, the user scans the "stop" barcode 39 to end the measurement of the cord and to lock the cord so that no further cord may be dispensed (FIG. 9*d*). At this point, label 14 preferably is automatically printed by the printer (FIG. 9*e*) and is applied to the cord (FIG. 9*f*).

Figure 5:
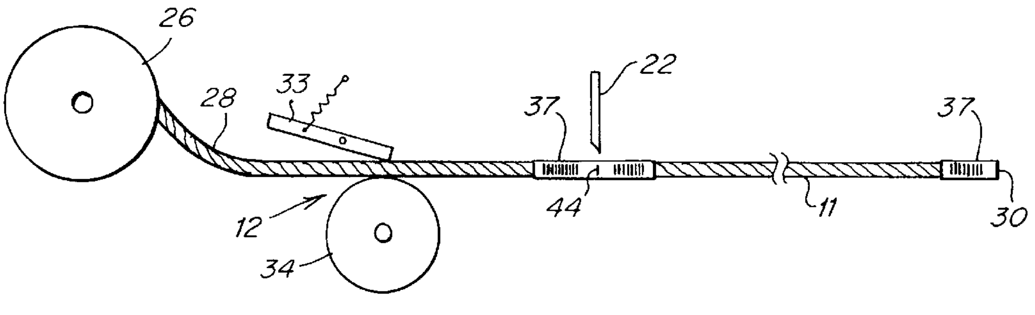
FIG. 5 is a diagrammatic side view illustrating a selected length of cord being dispensed from a spool.
Figure 6:
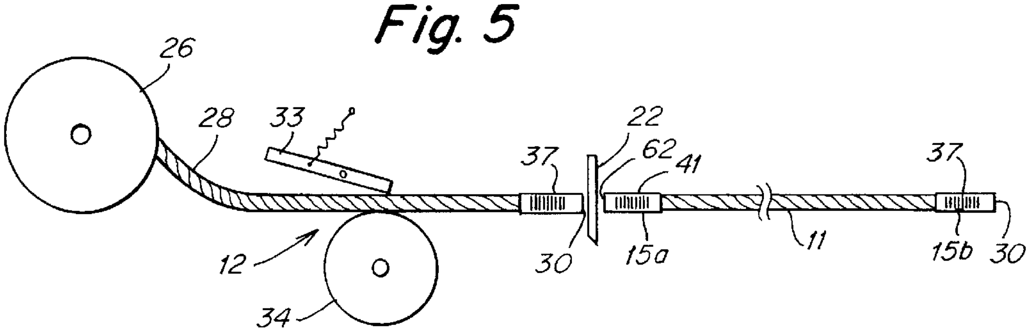
FIG. 6 is a diagrammatic side view illustrating the length of cord being severed from the spool of cord.
Figure 7:
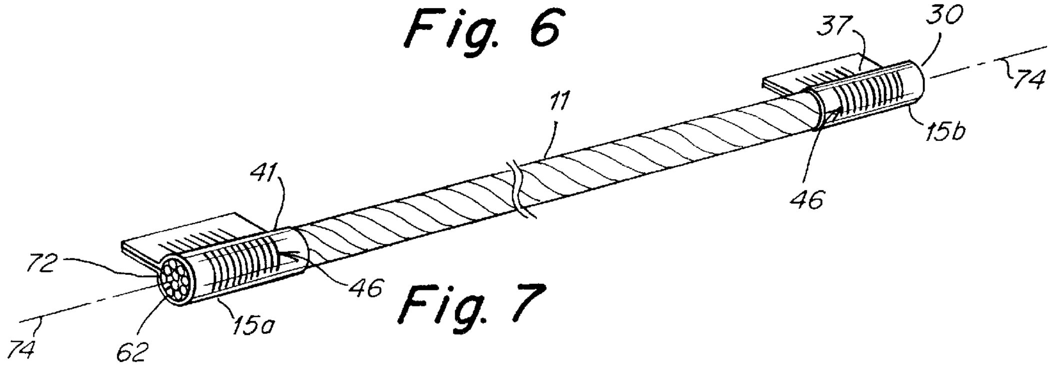
FIG. 7 is a perspective view of a severed length of cord illustrated with labels at each end.

Referring now to FIGS. 5–7 in conjunction with FIGS. 9*a*–9*h*, the label 14 is preferably wrapped completely around cord 28 so that it overlaps itself. This wrapping of the label facilitates the severing of the selected length of cord from the remaining cord. Conventional cutters may exert high compressive forces on the cord that can deform the cord perimeter 72 making it more difficult to cut, especially with stranded cords such as rope. The wrapped label retains the individual strands of the cord in a tight bundle, thereby reducing the deformation and making it easier to sever the cord. Alternatively, the label can be applied so that it partially wraps around the cord 28 with a portion of the label extending radially away from the cord so that it resembles a flag waving from a pole (FIG. 7). The label is preferably applied to the cord 28 with the bar code positioned so that the parallel lines 48 and 50, as well as the spaces 52 and 54, extend along the cord perimeter 72 and transverse to the cord axis 74. Alternatively, the label can be positioned so that the parallel lines 48 and 50, as well as the spaces 52 and 54, extend approximately parallel to the cord axis 74.

The selected length of cord 11 is then severed from the bulk of cord 28 preferably by using cutting device 22, which include a heat blade that is heated prior to severing (FIGS. 6 and 9*g*) to ensure a clean cut of the cord 28 and label 14. The selected length of cord 11 is severed at approximately the cut line 44 provided on the label 14, thereby creating trail end 62 for the selected length of cord 11. A first portion 41*a* (FIG. 7) of label 14 carrying indicia 15*a* remains on the trail end 62 of the selected length of cord 11, and a second portion 37*a* of label 14 carrying indicia 15*b* remains on the lead end 30 of the continuous length of cord 28. Identifying indicia 15*a* preferably includes the measurement of the selected length of cord dispensed, while identifying indicia 15*b* preferably includes the measurement of the cord remaining on the spool after the selected length has been dispensed. Once the cutting device 22 is activated, the locking mechanism is released and cord 28 may once again be advanced through the measuring device.

After the length of cord has been severed, the customer brings the length of cord to the register where the sale of the selected length of cord 11 can be checked for errors by matching the indicia 15*a* on the lead label 37 with the indicia 15*b* on the trail label 41. The labels 37 and 41 are compared for a match by scanning the bar codes, or visually matching the alphanumeric codes, product description, or colors making up the identifying indicia 15*a*, 15*b* carried on each label. The cashier may then enter the amount of cord purchased and scan the barcode attached to the cord to feed the identifying parameters into the register which will match the cord with the proper price to be charged for the cord.

Having described illustrative embodiments of the invention in detail, those skilled in the art will appreciate that numerous modifications may be made to these embodiments without departing from the spirit of the invention. Therefore, it is not intended that the breadth of the invention be limited to the specific embodiments illustrated and described. Rather, the breadth of the invention is determined by the appended claims and their equivalents.

What is claimed is:

1. An apparatus for measuring and identifying a segment of cord selected from a continuous length of cord, comprising:

a first indicia attached to a lead end of the segment of cord for identifying parameters of the cord;

measuring means for measuring the segment of cord as the lead end is advanced and the segment is dispensed from the continuous length of cord;

means for preventing the advancement of the cord through the measuring means after the segment of cord has been selected by the user;

means for dispensing a label containing second indicia functionally related to the first indicia, said label comprising a first portion and a second portion, said first and second portions including identifying parameters positioned to be physically separated such that the first portion remains on a trail end of the segment of cord and the second portion remains on said continuous length of cord.

2. The apparatus of claim 1, further comprising means for preventing the advancement of the cord through the measuring means after the segment of cord has been selected by the user.

3. The apparatus of claim 1, wherein the measuring means includes a pivotal lever and an engagement wheel.

4. The apparatus of claim 1, further comprising input means for inputting the identifying parameters into a computer operatively associated with the input means.

5. The apparatus of claim 4, wherein the input means comprises a laser scanner.

6. The apparatus of claim 4, wherein the input means comprises a keypad.

7. The apparatus of claim 1, further comprising a counter to visually indicate the measurement of the selected length of cord.

8. The apparatus of claim 7, wherein the counter visually indicates the amount of continuous length of cord remaining on the spool.

9. The apparatus of claim 1, wherein the first portion and the second portion include identical bar code indicia.

10. The apparatus of claim 1, wherein the first portion and the second portion include functionally related bar code indicia.

11. An apparatus for measuring and identifying a segment of cord selected from a continuous length of cord, comprising:

a first indicia attached to a lead end of the segment of cord for identifying parameters of the cord;

measuring means for measuring the segment of cord as the lead end is dispensed from the continuous length of cord;

means for securing to said cord, at the trail end of said segment, a label containing second indicia functionally related to the first indicia, said label comprising a first portion and a second portion, said first and second portions including identifying parameters positioned to be physically separated such that the first portion remains on a trail end of the segment of cord and the second portion remains on said continuous length of cord;

and means for severing the segment of cord from the continuous length of cord at said dispensed label intermediate said first portion and second portion thereof.

12. The apparatus of claim 11, further comprising means for aligning the cord with the cutting means prior to severing the cord.

13. The apparatus of claim 12, wherein the cutting means includes a heated blade to sever the selected length of cord and the label.

14. A method for labeling a selected length of cord dispensed from a continuous length of cord, comprising the steps of:

measuring a selected length of cord from the continuous length of cord;

applying a label to the selected length of cord at a position spaced from a lead end of the selected length of cord, the label having a pair of functionally related identification elements; and severing the selected length of cord from the continuous length of cord between the pair of identification elements such that one of the pair of identification elements remains on a trail end of the selected length of cord and the other of the pair of identification elements remains on a lead end of the continuous length of cord.

15. The method as recited in claim 14, further including the step of providing the spool with a lead label applied at the lead end of the cord.

16. The method as recited in claim 14, wherein the step of applying the label to the cord further includes the step of wrapping the label around the cord so that the label overlaps itself to facilitate severing the length of the cord.

* * * * *